United States Patent [19]

Donath

[11] 4,094,651

[45] June 13, 1978

[54] PROCESS FOR PSEUDOHYDROSTATIC FEEDING OF SOLIDS INTO A REACTOR

[76] Inventor: Ernest E. Donath, P.O. Box 1068, Christiansted, St. Croix, V.I. 00820

[21] Appl. No.: 800,847

[22] Filed: May 26, 1977

Related U.S. Application Data

[63] Continuation of Ser. No. 683,810, May 6, 1976, abandoned.

[51] Int. Cl.² .............................................. C10J 3/46
[52] U.S. Cl. .................................. 48/210; 48/DIG. 3; 48/DIG. 4; 201/35; 302/53; 302/66
[58] Field of Search ............................ 302/53, 59, 66; 48/197 R, 210, 201, DIG. 3, DIG. 4; 214/17 B; 423/659 F; 201/35

[56] References Cited

U.S. PATENT DOCUMENTS

| | | | |
|---|---|---|---|
| 1,559,810 | 11/1925 | Trent | 302/53 |
| 2,042,428 | 5/1936 | Krekeler | 302/66 |
| 2,304,827 | 12/1942 | Jewell | 302/53 |
| 2,311,564 | 2/1943 | Munday | 302/53 |
| 2,925,928 | 2/1960 | Martin | 214/17 B |
| 3,105,736 | 10/1963 | Groves | 302/53 |

OTHER PUBLICATIONS

"Pneumatic Feeder for Finely Divided Solids" Albright et al., reprinted from Chem. Engr. Jun. 1949.
"Pressure Feeder for Powdered Coal or Other Finely Divided Solids" Barker et al., Industrial and Engr. Chem. May, 1951, pp. 1204–1209.

Primary Examiner—S. Leon Bashore
Assistant Examiner—Peter F. Kratz
Attorney, Agent, or Firm—Larson, Taylor and Hinds

[57] ABSTRACT

A method for continuously reacting particulate solids with gases and/or vapors at elevated pressures by feeding the particulate solids into a reaction zone under the pseudohydrostatic pressure generated by very tall fluidized columns of particulate solids, with the descent velocity of the solids and gas in the columns being greater than the ascent velocity of the gas. Fluidizing gas is preferably used at selected points in the column in order to avoid a harmful compaction of the particulate solids.

8 Claims, 4 Drawing Figures

PROCESS FOR PSEUDOHYDROSTATIC FEEDING OF SOLIDS INTO A REACTOR

This is a continuation, of application, Ser. No. 683,810 filed May 6, 1976 and now abandoned.

FIELD OF THE INVENTION

The process invention relates to the feeding of particulate solids such as coal into pressurized reaction zones and, in particular, to a method of feeding such solids which utilizes pseudohydrostatic pressure.

BACKGROUND OF THE INVENTION

The reaction of particulate solids with gases and/or vapors at elevated pressures are of increasing importance in recent years and such processes as gasification, hydrogasification an hydrocarbonization of coal have taken on greater significance due to the worldwide petroleum shortage. In many of these reactions, the solids must be brought into a pressurized reaction zone.

At present, two solids feeding systems are conventionally used for feeding particulate materials such as coal into reaction zones, viz., (1) pressurized lock hoppers and (2) systems wherein a slurry of the particulate material is made using a liquid such as water or low boiling hydrocarbons. The principal drawbacks of the first system are the intermittent batchwise operation employed and the high power requirements for the compression of the gas needed to pressurize the lock hopper and displace the solids. The disadvantage of the second system is the high requirement of heat for the evaporation of the slurrying liquid and the usual need for the separation of the vapor from the solids. The temperature required for the evaporation of the slurrying liquid may have a deleterious influence on the properties of the solids and the decomposition products may contaminate the separate vapor of the slurrying liquid.

Methods for feeding solids to a reaction zone have also been proposed wherein a compact column is used (see, e.g., U.S. Pat. Nos. 2,726,137; 2,761,575; 2,837,467; 2,713,949; and 2,854,157). In general, this approach suffers from high operating costs and power requirements. In addition, the use of fluidized columns in feeding solids into a reaction zone has also been proposed. This approach provides for maintaining the fine solids in a stationary position or requires the withdrawal of fluidizing gas from the column (see, U.S. Pat. Nos. 2,925,928 and 2,753,061). Again, such approaches suffer disadvantages relating to high energy requirements, similarly to the methods discussed above.

It will be appreciated that while the systems discussed above are the systems conventionally used in feeding coal for the purposes outlined, other feeding techniques for other more general purposes are, of course, widely known and used. Insofar as these techniques bear on the present invention, it is noted that the broad concept of utilizing column pressure in the feeding of materials in general is not novel and reference is made to U.S. Pat. Nos. 2,723,883; 2,770,503; 2,919,159; 2,922,611; and 3,062,589 for examples of systems using this general technique.

SUMMARY OF THE INVENTION

The present invention overcomes these disadvantages of the above discussed feed systems by utilizing the pseudohydrostatic pressure of columns of particulate solids in the feeding of the solids into the reaction zone of the reactor system. Applicant has discovered that under controlled fluidizing conditions, particulate solids can be continuously feed to a reactor with a significant saving in energy consumption, and in a manner that is both technically feasible and efficient. According to a further aspect of the invention, fluidizing gas is minimized and thus the energy required for the compression thereof in a fluidized column feed system is conserved by providing a rate of descent of the particulate solids which are in a state of incipient fluidization which is greater than the ascent velocity of the fluidized gas with respect to the column.

In most particulate bulk solids, the void volume is very roughly of the order of about one half. In compressing such a bed of solids, considerable compaction occurs and the solid bed loses its free movability. According to a further feature of the invention, to avoid this compaction and the loss of ability to flow freely, fluidizing gas is to be added at appropriate points as the pressure in the column increases. The amount of fluidizing gas to be added and the locations at which these additions occur depends on the bulk density of the solids, the absolute pressure at a given point and the amount of gas already present. The determination of the pressure at the point of addition and the pressure increase from point to point along the column permits a determination of the amount of additional fluidizing gas which is necessary to assure a smooth descent through the column of particulate solids and an even transport of the solids at the bottom of the column to the reactor or another column with the addition of a transport gas. In general, about a 5 percent expansion of the bulk solids by addition of fluidizing gas in a proper distribution is sufficient to make the solid bed free flowing. It should be noted that there is inertia of the movement of the column and therefore, some variation in maintaining the amount of bed expansion is permissible to allow a free and almost frictionless descent of the solids column.

In accordance with the present invention, a process is provided for continuously reacting particulate solids with gases and/or vapors at elevated pressures of at least 80 psi wherein the particulate solids are continuously feed to a reaction zone by a series of fluidized columns, which columns are of a height sufficient to exert a pseudohydrostatic pressure on the solids in feeding of the solids to the reaction zone. The minimum height of the columns is approximately 200 feet although as explained hereinafter, the column height chosen will depend on several factors. Bed heights of 300 to 500 feet or more are suitable and practical in connection with the tall structures needed to support the equipment of, for example, modern coal gasification processes. The pressure increase in each bed exceeds 38 psi and may be 80 psi or more. In addition, provision is made for the introduction and the release of excess gas in the column to maintain the proper fluidized state of the particles. As noted, the process of the present invention provides significant advantages in the areas of reduced total energy requirements and reduced total heat requirements.

Other features and advantages of the invention will be set forth in, or apparent from, the detailed description of a preferred embodiment found hereinbelow.

DESCRIPTION OF THE PREFERRED EMBODIMENTS

Figure 1:
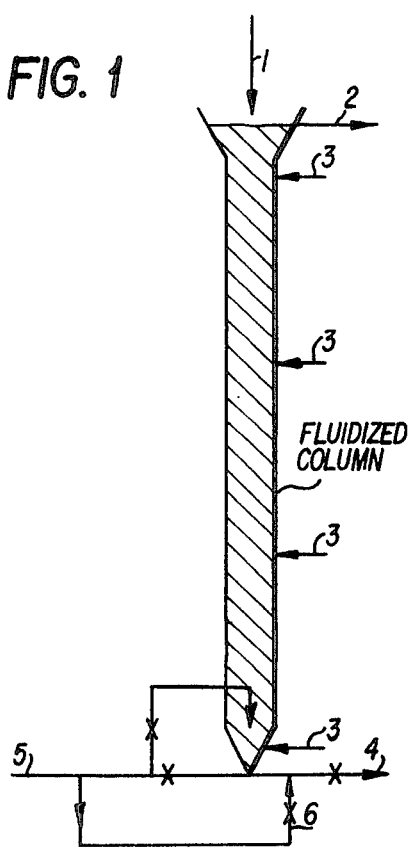
FIG. 1 is a schematic diagram illustrating a single fluidized bed column constructed in accordance with the invention.

The basic operating principles of the feeding process of the invention will be described relative to FIG. 1. Coal pulverized to −100 mesh and dried, is elevated by a skip hoist into a coal bin and weigh feeder, which are not shown in FIG. 1, and which are located on top of the feed column or bed. The bed is filled with this coal which is then expanded by fluidizing gas to an average of about 5 percent above its settled bulk density by added fluidizing gas. The gas velocity relatively to the coal and related to the empty cross-section of the column is about 0.01 to 0.1 feet/second with an average value close to 0.05 feet/second. The coal, which is indicated by the arrow denoted 1, is fed at the top and withdrawn at the bottom at such a rate that its descent velocity is more than 1 foot/second. This descent velocity may be 2 to 5 feet/second or more. Thus, the fluidizing gas, while ascending relatively to the coal, descends with the coal bed, which moves more rapidly downward in relation to the container. The descent of the fluidized coal bed is virtually frictionless and therefore its weight is realized as a pseudohydrostatic pressure at the bottom of the bed. As mentioned above, fluidizing gas is added to the descending coal as its pressure increases to maintain the desired fluidized state and bed expansion. The location and the quantity of gas which is added to the system is a function of the solid properties of the particles being fluidized. The fluidizing gas can be derived from the reactant gases used in the reactor.

It is noted that the bed expansion needed for incipient fluidization of 5 to 10 percent is not necessary over the entire length of the bed. The particulate solids may partly descend in the column at essentially the bulk density of the solids measured in the usual way. In this case, the descent velocity of the solids should exceed that given by the formula $V = 0.2 \sqrt{D}$, where V is the descent velocity of the solids in feet per second and D is the internal diameter of the column in inches. The compaction of the solids in the bed due to pressure increase that may occur must be counteracted by the addition of fluidizing gas at intervals indicated at 3, that are determined experimentally.

If coal is used, especially if the coal is not thoroughly dried, an addition of 0.5 to 4 percent oil will improve the smoothness of the descent, particularly where fine coals are used with a moisture content above 2 percent.

The coal feed rate can be controlled in different ways. For instance, the feed rate may be set by the weigh feeder at the top of the first column. A coal level measuring device, indicated at 2, located at the head of the column controls the amount of transport gas 5 flowing to the eductors (not shown) at the bottom of the bed. An increase of the gas rate to the eductors will increase coal flow and vice-versa. On the other hand, addition of control gas 6 after the coal has passed the eductors reduces the coal feed rate, while maintaining the necessary transport velocity in the feed line to the reactor or the next column.

Another means for determining the coal flow rate is by measuring the pressure drop in calibrated sections of the pneumatic feeding lines 4. This provides a measure of the instantaneous coal flow and may be used in adjusting the coal flow that maintains the coal level in a first feeder column.

Regardless of the method selected to monitor and control the coal feed rate, it is desirable to provide a means of throttling the flow of coal at the bottom of each bed. Although such throttling increases the power requirement somewhat, it assures that no blow-back occurs due to unavoidable small variations in flow rate and pressure during operation. The amount of throttling depends on the absolute pressure level, the feed rate as a percent of maximum feed rate and the fluidizing properties of the feed. In general, a pressure reduction by the throttling device of 1 percent of the absolute pressure is sufficient. However, in some cases a pressure reduction up to 5 percent of absolute is needed to assure uniform feed rates.

The degree of throttling depends to some extent upon the accidental pressure variations that may occur in the reactors and adjacent equipment into which the solids are fed. Larger variations require a greater degree of throttling than small ones. In case of unavoidable, comparatively large pressure fluctations in the equipment, the use of an intermediary vessel between feeder and reactor is indicated. The throttling device, e.g., a funnel that decreases the bed diameter gradually, may have provisions for the change of the cross-section during operation to change the solids flow rate. Several throttling devices and eductors may be connected to one feeder bed to provide a solids feed to several points in parallel.

These devices may be replaced or supplemented by other means that provide resistance to the transfer to pressure fluctuations such as star wheels or screw feeders. The use of such devices will sometimes necessitate provisions for the separation of the fluidizing gas from the particulate solids.

The solids leaving the bottom of the bed are transported pneumatically to the next column or to the reactor by means of the gas 5, fed to the eductor. In this way, the transport density is made lower than the bed density. The transport density in all cases is less than 60 percent of the bulk density of the solids and is usually much lower. The transport density depends on the economics of providing transport gas and on the requirements of the process.

Figure 3:
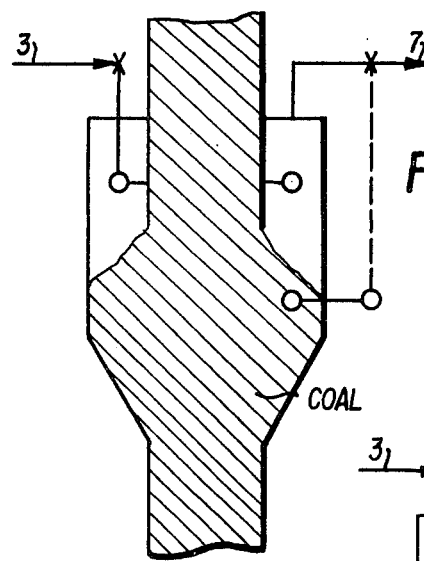
FIG. 3 is a device located in the column for the withdrawal of gas during shut down.

In case of flow stoppages or normal shut down, a shut-off valve in the pneumatic feed line prevents blow-back. It is desirable to equip the points of fluidizing gas additions or other suitable points with devices for the withdrawal of excess fluidizing gas, indicated at 7 in FIG. 3, which ascends the column during the shutdown. A schematic of such a device is shown as FIG. 3. Suitably a larger surface area is provided to permit separation of the settling solids from the escaping gas.

Figure 4:
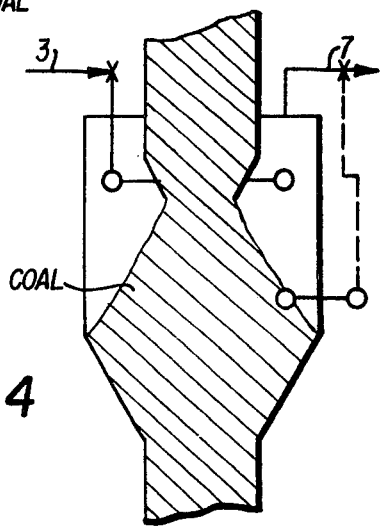
FIG. 4 is a detail of a throttling zone in fluidized bed column in accordance with a further embodiment of the invention.

It has also been observed that when the column is constricted at several points as shown in FIG. 4, that the uniformity of flow of the particles is significantly improved. This effect is especially pronounced when materials which have a tendency to slug are being fluidized.

As previously mentioned, tall coal columns are necessary to attain the elevated pressures needed in modern pulverized coal processing. Thus, at a bed density of 33lb/cf a column height of 372 feet is needed to obtain a pressure of 100 psi. This column height can be reduced by using a multi-bed feeder as shown schematically in FIG. 2. If higher pressures are needed, the same or even greater column heights may be used. The minimum practical bed height for present day coal processing needed to achieve a maximum pressure of approximately 3.6 atm gage, which is 2.6 atm above the top of the column, is 200 feet, however the usual minimum bed height is 350 feet. In a multibed feeder the coal from the bottom of column 1 is pneumatically transported to the top of column 2 through riser 1 where it enters a cyclone or other gas-solids separator. The coal drops into column 2 and descends to its bottom from where the coal is again pneumatically transported through riser 2 to the top of column 3. Following separation of the gas and coal the latter descends in column 3 and reaches a desired pressure at bottom of the bed. The solids are then fed pneumatically through line 4 with feed gas 7 to the reactor or to a pressurized intermediate feed vessel. The transport gas separated at the top of column 3 is used as the transport gas at the bottom of column 1. The transport gas from the top of column 2 passes through a dust filter 8 and is then compressed by the booster-compressor 9 to the pressure needed for use as the transport gas at the bottom of this bed.

To attain higher pressures of up to 1000 to 1500 psi, taller beds and/or more than three beds are used. The transport gas from the top of the last column $n$ is used directly as feed gas at the bottom of column $n$-2, similarly from column $n$-1 to $n$-3 and so on, and the transport gas from the top of column 2 may be compressed and used as feed gas at the bottom of column 2.

The manufacture of synthetic natural gas from coal requires pressures of the order of 1000 psi in order to obtain a large proportion of methane directly from the coal. To attain such pressure it is necessary to utilize a multibed feeder consisting of 8 columns each of about 700 foot height.

The following examples illustrate the energy savings of the instant invention over conventional techniques:

EXAMPLE I

Figure 2:
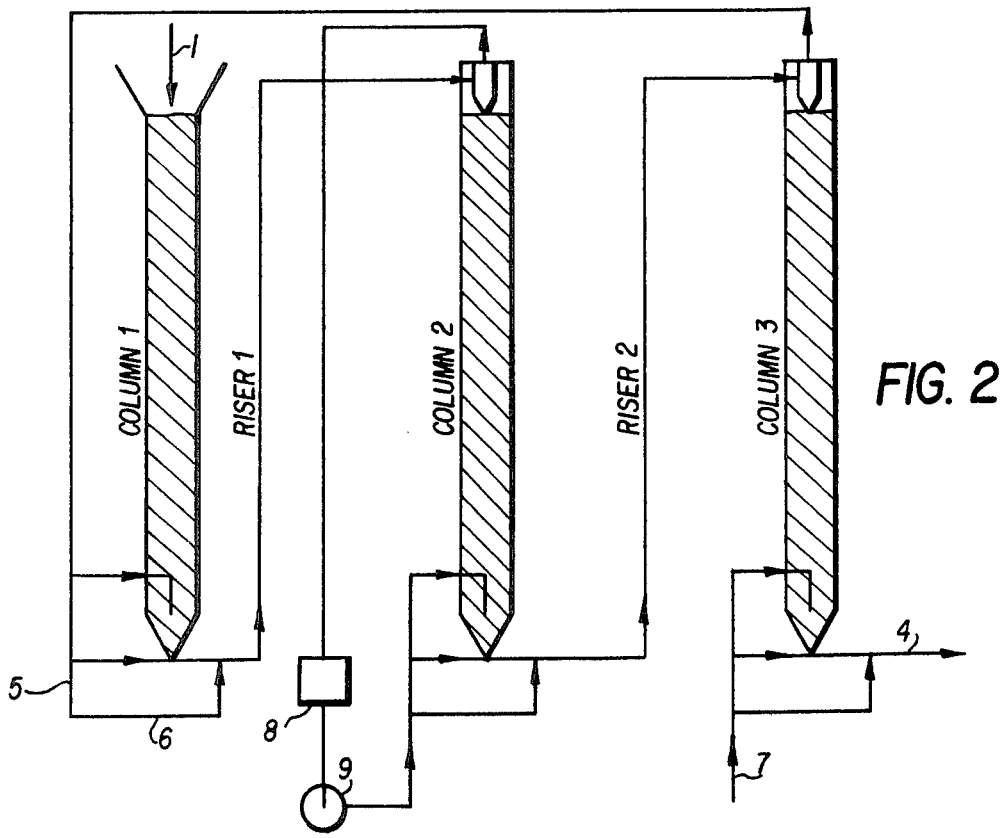
FIG. 2 is a diagram similar to that of FIG. 1 illustrating a multiple fluidized bed column system.

A feeder column similar to that shown in FIG. 1 and 2.1 feet internal diameter, contains a coal bed of 372 feet height. At a descent velocity of the coal of 2 feet/second and a bulk density of about 33 pounds per cubic foot, a feed rate of 400 tons/hour of coal is obtained. The bottom section of the column has a diameter of approximately 1.5 feet in a funnel shape with sides that slope at an angle of 15° to the axis of the column and which joins the eductor at the bottom of the column. Transport gas is added to the coal at a pressure of 100 psi in an amount of 220 MScf/h which reduces the coal density for the transport to the reactor to 14 lb/cf. The flow to the reactor is at a velocity of about 75 ft/sec in a conduit of 6 inches ID.

At various points of the column fluidizing gas is added in the total amount of 84 MScf/h to avoid compaction of the coal. In general, additional fluidizing gas is selectively introduced into the column at those points where the bulk density of the solids is less than 1% smaller than the non-fluidized bulk density of the solids. The average velocity of the fluidizing gas is approximately 0.05 ft/sec related to the empty cross-section and 0.08 ft/sec related to the column filled with coal and thus, is much smaller than the descent rate of the coal in the column. However, it should be noted that this is an average gas velocity. At points where compression of the coal due to increase in pressure while descending may develop, portions of the fluidizing gas will rise at a higher rate to contribute to maintaining an even coal distribution. In order to assist therein the fluidizing gas is added through nozzles at a high velocity to penetrate into the coal column.

Utilizing the teachings of the prior art, two 7100 cf lock hoppers that are capable of feeding 400t/h are filled to 85 percent and are alternately charged and discharged on a 15 minute cycle. These hoppers have 10 feet ID and are 90 feet high. For the pressurization of the hoppers and the discharging of the coal, 270 MScf per hour of gas are required.

The following provides a comparison between the equipment size and the energy requirements of a feeder column and a lock hopper system.

|  |  | Present Invention | Lock Hopper |
|---|---|---|---|
| Pressure Vessel Volume: |  |  |  |
| Feeder column 2.1 ft ID |  | 1320 cf | — |
| 2 Lock hoppers 10 ft ID |  | — | 14,200 cf |
| Power Requirements: |  |  |  |
| Mechanical coal lift 400 ft |  | 160 KW | — |
|  | 118 ft | — | 48 KW |
| Gas Compression 100 psia |  |  |  |
| 84 MScf/hr |  | 195 KW | — |
| 270 MScf/hr |  | — | 615 KW |
| Total Power Requirements |  | 355 KW | 663 KW |

The power requirement of compressing the transport gas is equal in both cases and has been omitted.

EXAMPLE II

The total height of the feeder in Example I including coal storage vessel and weight feeder at the top of the feed column and space underneath for the coal withdrawal by the eductor and its piping is 450 feet. To attain higher pressures and avoid an increase of the feeder height, a three column feeder as shown schematically in FIG. 2 is used. The diameter of each column is again 2.1 feet and the coal column heights are again 372 feet each. The coal feed rate is 400 t/h and fluidizing gas is added to the columns as described in Example I for one column. The coal is moved pneumatically through risers that are essentially vertical from the bottom of bed 1 to the top of bed 2 and from the bottom of bed 2 to the top of bed 3. The transport gas separated at the top of bed 3 at about 152 psia is used as transport gas at the bottom of bed 1 were the pressure is about 100 psia. The transport gas from top of bed 2 passes through a dust filter to a booster-compressor to be reused at the bottom of bed 2 at a pressure of about 173 psia. The amount of transport gas at the bottom of bed 1 is 256 Scf/sec and this leads to a reduction of the bulk density from about 33 lb/cf to about 5 lb/cf in the riser leading from bed 1 to bed 2 in FIG. 2. The riser has a diameter of 10 inches and the flow velocity therein is about 80 ft/sec. The pressure loss in the riser of 12.9 psi leads to a pressure of 87.1 psia at the top of bed 2 and of 172.4 psia at the bottom of bed 2. In bed 2, fluidizing gas in the amount of 25 Scf/sec is added to avoid coal compaction. Compression of 256 Scf/sec transport gas from the top of bed 2 to 172.4 psia at the bottom of bed 2 brings the transport gas volume there to 21.9 Acf/sec and the transport density in riser 2 to about 7.8 lb/cf. Riser 2 has an ID of 9.3 inches and the flow velocity is about 60 ft/sec. This leads to the pressures in the three beds indicated in the following tabulation:

| Bed No. | 1 | 2 | 3 |
|---|---|---|---|
| Pressure psia at the top | 14.7 | 87.1 | 152.3 |
| Pressure psia at bottom | 100 | 172.4 | 238 |
| Pressure reduction in riser,psi | 12.9 | 20.1 | (to reactor) |

The power requirement and the volumes of major equipment needed (i) according to the present invention, and (ii) when using lock hoppers to pressurize coal for gasification at 238 psia, are given in the following table. It has been assumed that for continuous operation two lock hoppers would be used on a 15 minute cycle and that the hoppers would be filled to 85 percent of their volume.

| Feeding procedure | Present Example | Lock Hopper |
|---|---|---|
| Power requirement: | | |
| Mechanical Coal Lift 450 ft | 225 KW | — |
| | — | 48 KW |
| Gas Compression: | | |
| 923 MScf/h; 86 to 173 psia | 700 KW | — |
| 555 MScf/h; 14.7 to 238 psia | — | 1850 KW |
| Total Power Required | 925 KW | 1898 KW |
| Volume of major pressure equipment: | | |
| 3 columns 2.1 ft ID, 380 ft long | 3950 cf | — |
| 2 Hoppers, each 200,000 lb coal | — | 14300 cf |

Although the invention has been described relative to a preferred embodiment thereof, it will be understood by those skilled in the art that variations and modifications can be effected in this preferred embodiment without departing from the scope and spirit of the invention.

I claim:

1. In a method for the continuous reaction of pulverized coal with gases or vapors at a pressure of at least 80 psi, and including shutdown of the operation as required the improvement comprising continuously feeding said pulverized coal into a reaction zone utilizing the pseudohydrostatic pressure of a fluidized column which is of a height of at least 200 feet and includes additions of fluidizing gas at selected points of the column, by passing said pulverized coal downwardly through said column at a descent velocity of the pulverized coal in the column which is greater than the ascent velocity of the fluidizing gas relative to the pulverized coal, the average velocity of the fluidizing gas in the column being between 0.01 and 0.1 feet per second relative to the fluidized coal and the descent velocity of said coal being at least 1 foot per second, said method further including removing excess gas below the top of said column during said shutdown and further comprising controlling the feed rate at the bottom of said column by throttling the flow of coal, a pressure reduction of up to 5 percent of absolute being effected by said throttling.

2. The method of claim 1 wherein at least two communicating fluidized columns of pulverized coal are used, the pressure of each succeeding column being geater than that of the preceeding column.

3. The method of claim 1 wherein additional fluidizing gas is selectively introduced into said column at those points where the bulk density of said pulverized coal is less than 1 percent smaller than the nonfluidized bulk density of said coal.

4. The method of claim 1 wherein the fluidizing gases are derived from the reactant gases used in said reactor.

5. The method of claim 2 wherein said coal is transported between columns at a density of less than 60 percent of the bed density of said columns.

6. The method of claim 1 wherein said coal has between 0.5 and 4 percent oil added thereto.

7. The method of claim 1 wherein the descent velocity in feet per second of said coal is greater than one-fifth of the square root of the internal diameter of said column in inches.

8. The method of claim 1 wherein the pressure at the bottom of each column exceeds that at the top by at least 38 psi.

* * * * *